United States Patent [19]
Pike et al.

[11] Patent Number: 5,865,400
[45] Date of Patent: Feb. 2, 1999

[54] MULTIPIECE, SLIDABLE DUCT ASSEMBLY FOR AIRCRAFT ANIT-ICING CONDUIT SYSTEMS

[75] Inventors: Walter E. Pike, Castaic; Jan C. Shafer, Thousand Oaks, both of Calif.

[73] Assignee: Senior Flexonics Inc. Stainless Steel Products Division, Burbank, Calif.

[21] Appl. No.: 668,433

[22] Filed: Jun. 17, 1996

[51] Int. Cl.⁶ ............................................. B64D 15/04
[52] U.S. Cl. ............................... 244/134 B; 239/587.1; 239/DIG. 4; 285/302
[58] Field of Search ................... 244/134 A, 134 B, 244/214; 138/149, 120; 239/587.1, 587.2, 587.5, DIG. 4; 285/300, 302

[56] References Cited

U.S. PATENT DOCUMENTS

| | | | |
|---|---|---|---|
| 3,656,784 | 4/1972 | Dow et al. | 285/302 X |
| 4,296,953 | 10/1981 | Nagao et al. | 285/302 |
| 4,543,677 | 10/1985 | Haglund et al. | 285/302 X |
| 4,603,824 | 8/1986 | McArdel | 244/134 B |
| 4,615,499 | 10/1986 | Knowler | 244/134 B |
| 4,752,049 | 6/1988 | Cole | 244/134 B |
| 4,976,397 | 12/1990 | Rudolph et al. | 244/134 B |

*Primary Examiner*—William Grant
*Attorney, Agent, or Firm*—Dick and Harris

[57] ABSTRACT

Disclosed is a pressurized, slidable duct assembly for conducting compressed air from a fixed component to a component that is movable with respect to the fixed component. The duct assembly has at least three metallic, telescoping, tubular conduit sections rotatably interconnecting an air supply duct to an air delivery duct. An upstream slide bearing and a spaced-apart downstream slide bearing are disposed between each pair of opposing inner and outer conduit section surfaces. Disposed between each set of upstream and downstream slide bearings is a seal to substantially prevent the escape of air from the duct assembly. A stop located between each seal and downstream slide bearing axially positions the conduit sections when the duct assembly is fully extended.

28 Claims, 4 Drawing Sheets

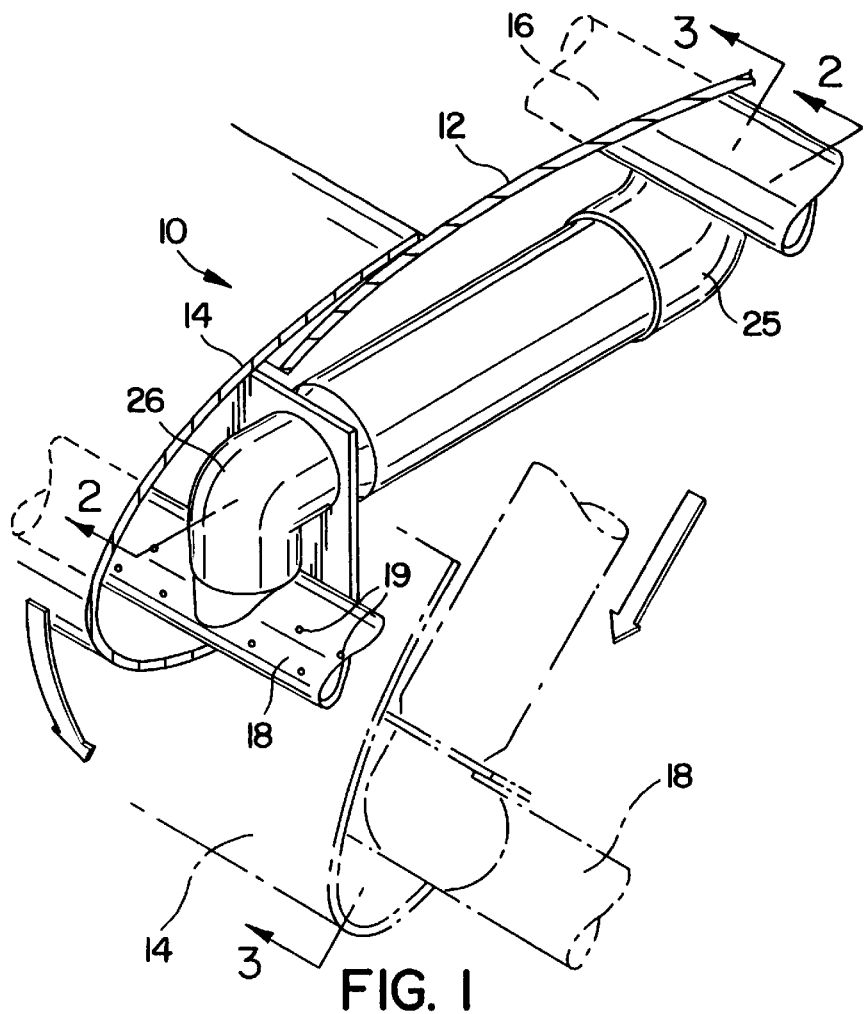
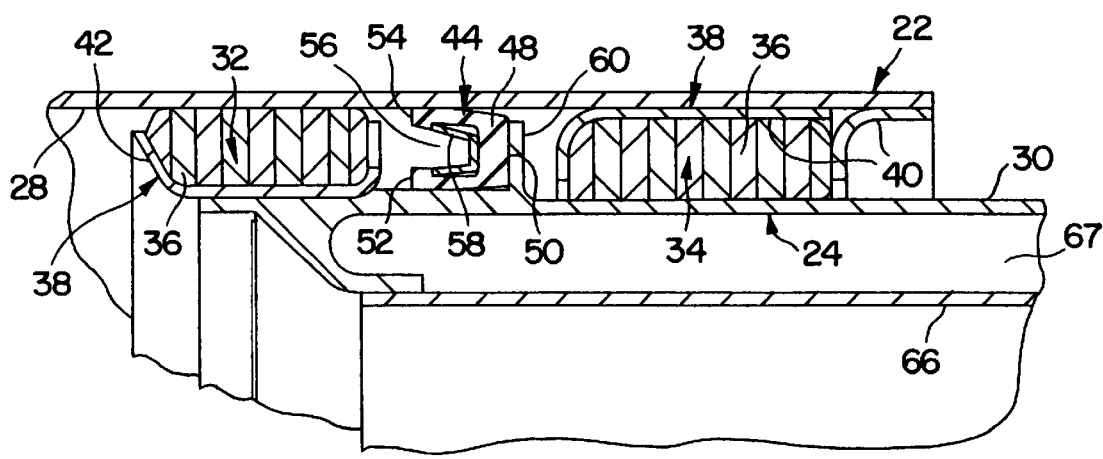

MULTIPIECE, SLIDABLE DUCT ASSEMBLY FOR AIRCRAFT ANIT-ICING CONDUIT SYSTEMS

BACKGROUND OF THE INVENTION

1. Field of the Invention

This invention relates to the mechanical arts. In particular, it relates to a slidable duct assembly for use in aircraft anti-icing conduit systems.

2. Discussion of the Related Art

As is well-known, jet aircraft engines provide the thrust needed to propel jet aircraft. Additionally, by redirecting a portion of the compressed, bleed air produced by the engines through a conduit system, the air can be used for a variety of other purposes. These other purposes include pressurizing, heating, and cooling the aircraft's cabin, and removing moisture from its front windows. To be effective, the conduit system must not only minimize the escape of the bleed air, but it must withstand the elevated temperatures, often in excess of 650° F., of the bleed air produced by today's jet aircraft.

Another important use for the bleed air is to de-ice the aircraft wings' leading edges, wing slats, and elevons. For example, to de-ice the movable slats located on the leading edge of the aircraft wings, hot, compressed, bleed air is transferred through conduit sections from a supply duct running lengthwise in the wings' leading edge to a spray duct running lengthwise in the wings' slats. The spray duct has openings to deliver the bleed air to the interior surface of the slats.

Special considerations are involved in the anti-icing conduit systems used to de-ice movable portions of the aircraft, such as wing slats and elevons, that must undergo a wide range of motions as they are extended and then retracted. In order to track the movement of these components, the conduit system must contain at least two slidable and rotatable conduit sections. Conventional duct assemblies are formed from metallic, tubular, telescoping conduit sections. To maintain the air pressure within the assembly, each conduit section is sealed with an elastomeric seal. It is a drawback of such seals, that they become unstable, if the telescoping conduit sections extend and retract relatively long distances. Consequently, it is a desideratum to design duct assemblies containing more than two conduit sections, so that the distance any conduit duct must extend and retract is minimized. It is a drawback of such multipiece systems, however, that as the number of conduit sections increases, it becomes more and more difficult to ensure that each section will be properly positioned when the duct assembly is fully extended or retracted.

Accordingly, there has existed a definite need for an improved, slidable duct assembly which minimizes the escape of compressed air and is stable at high temperatures. There has existed a still further need for a multipiece, slidable duct assembly that maintains the proper position of each telescoping conduit section as the duct assembly extends and contracts. The present invention satisfies these and other needs and provides further related advantages.

SUMMARY OF THE INVENTION

Now in accordance with the invention there has been found an improved, pressurized slidable duct assembly for conducting compressed air from a fixed component to a component that is movable with respect to the fixed component. The duct assembly conducts air from a fixed means for supplying the air, associated with the fixed component, to a means for delivering the air, movable along with the movable component. In preferred embodiments, the slidable duct assembly interconnects an air supply duct running lengthwise in a fixed portion of an aircraft wing to a spray duct running lengthwise in a movable wing slat or elevon.

The duct assembly has at least three metallic, telescoping, tubular conduit sections rotatably interconnecting an air supply means to an air delivery means. An upstream slide bearing and a spaced-apart downstream slide bearing are disposed between each pair of opposing inner and outer conduit section surfaces. In some embodiments, each slide bearing is formed by an annular retainer longitudinally securing an annular slide bearing ring.

Disposed between each set of upstream and downstream slide bearings is a seal to substantially prevent the escape of air from the duct assembly. A stop located between each seal and downstream slide bearing axially positions the conduit sections when the duct assembly is fully extended. In some embodiments, each stop is formed by a flange extending radially from one of the opposing inner and outer conduit section surfaces and each stop longitudinally secures one of the seals.

Further, in some embodiments, each downstream slide bearing is affixed by its annular retainer to the inner surface and each upstream bearing is affixed by its annular retainer to the outer surface of each pair of opposing inner and outer conduit section surface. In these embodiments, each stop is affixed to the outer surface of a conduit section abutting the upstream end of a seal.

And in preferred embodiments, a downstream transitional joint forms a substantially gas-tight seal with the innermost conduit section. In these embodiments, a stop located on the outside of the transitional joint axially positions the conduit sections when the duct assembly is fully retracted.

BRIEF DESCRIPTION OF THE DRAWINGS

FIG. 1 is a simplified, cross-sectional view of the leading edge of an aircraft wing having a movable slat and a slidable duct assembly in accordance with the invention, the view showing the slat retracted and, by a broken line, the slat extended;

FIG. 5 is an enlarged view of a portion of FIG. 4 detailing the slide bearings and seals.

DETAILED DESCRIPTION OF THE PREFERRED EMBODIMENTS

Figure 2:
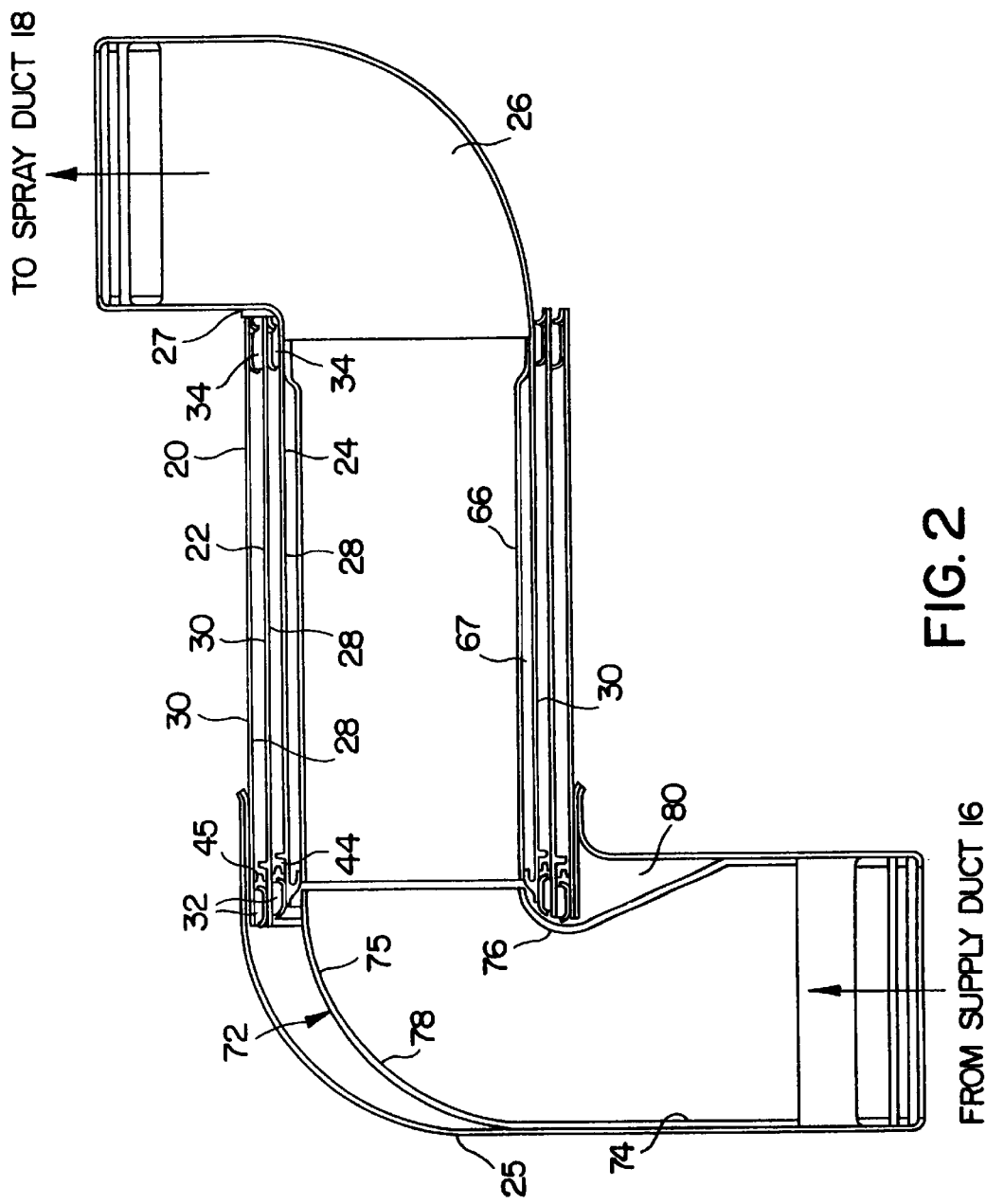
FIG. 2 is a cross-sectional view of the slidable duct assembly shown in FIG. 1 when the duct assembly is retracted.

To exemplify the inventive, pressurized, slidable duct assembly, the following description may concentrate primarily on the de-icing of wing slats located on the leading edge of an aircraft wing. It should be readily apparent to the skilled artisan that the description with little or no modification might also apply to de-icing other movable components, such as the elevons found on the wing's tailing edge.

FIG. 1 represents a cross-sectional view of a portion of a leading edge 10 of an airplane wing. The figure has been simplified to help in understanding the conduit system in accordance with the invention. Shown is a fixed portion 12 and a movable wing slat 14. The wing slat is normally retracted to nest against the wing's leading edge when in high-altitude flight and is deployed by a suitable actuator (not shown) into the illustrated broken-line position for take-offs and landings. Hot, compressed, bleed air is conducted from the aircraft engine (not shown) to a suitable transfer point on the wing's leading edge by a supply duct 16 running lengthwise in the wing's leading edge. From the supply duct, the bleed air is conducted to a spray duct 18 running lengthwise in the wing slats. Openings 19 deliver the bleed air to the interior surface of the wing slat.

Figure 3:
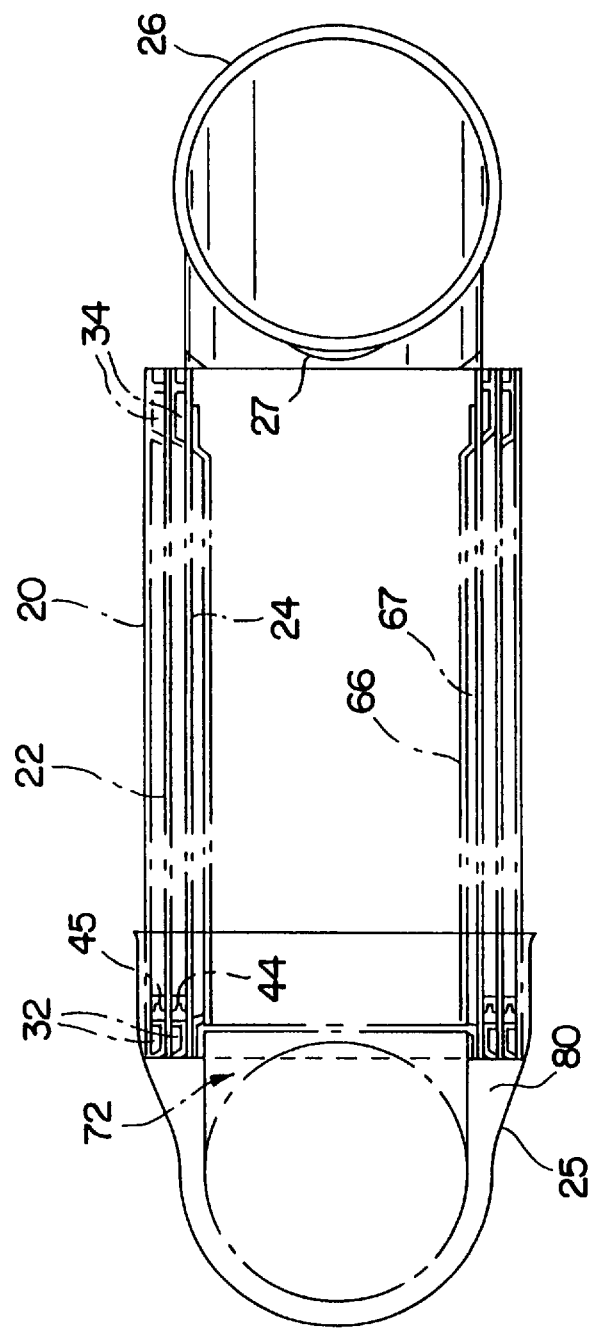
FIG. 3 is a top plan view of the slidable duct assembly shown in FIG. 2 with the inner telescoping conduit sections shown in phantom.
Figure 4:
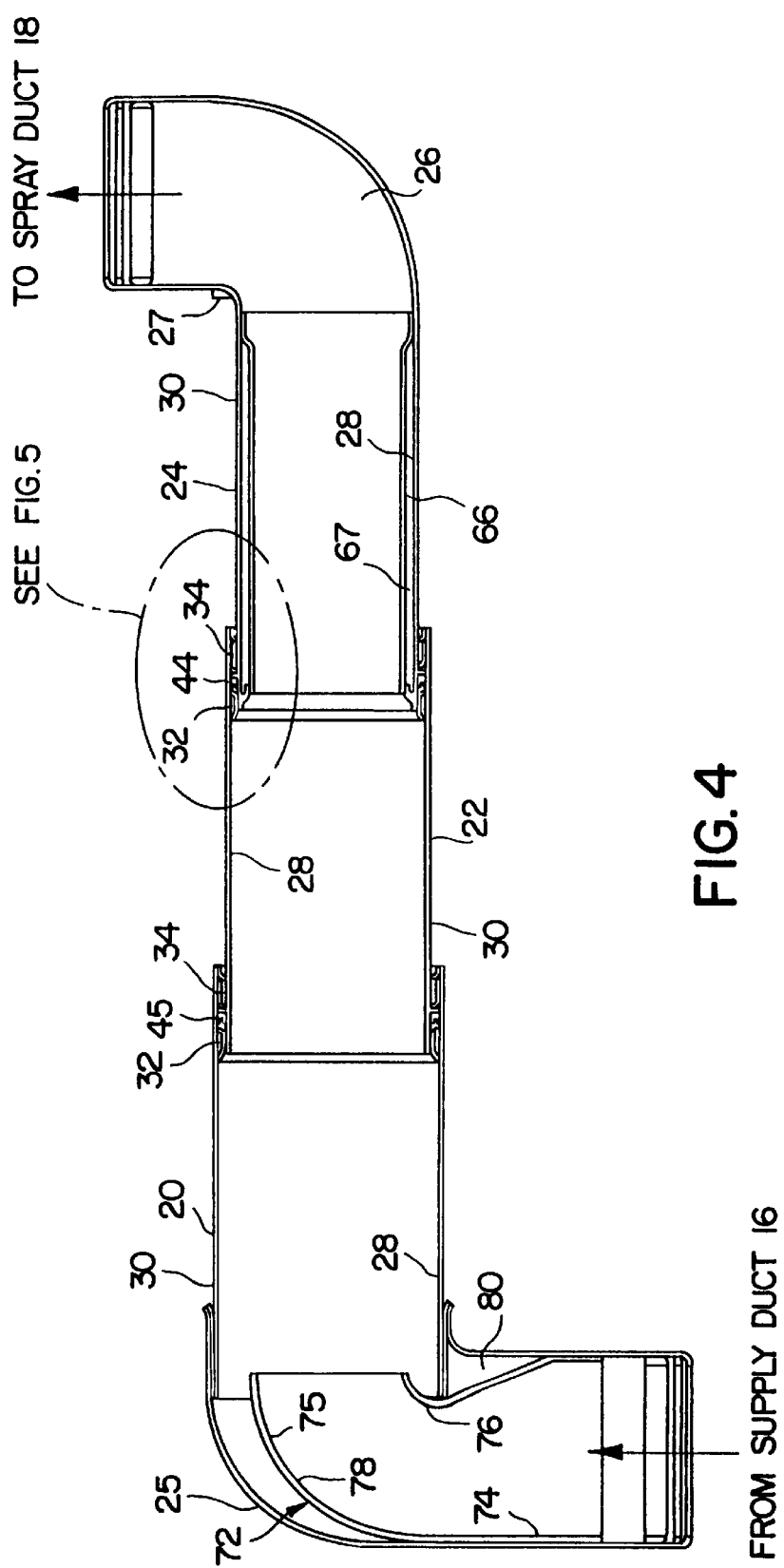
FIG. 4 is a cross-sectional view of the slidable duct assembly shown in FIG. 1 when the duct assembly is extended.

As shown in FIGS. 2–4, the bleed air is conducted by way of a plurality of metallic, telescoping, tubular conduit sections 20, 22 and 24, including an outermost conduit section 20 and an innermost conduit section 24. The tubular conduit sections are used to telescope the duct assembly to the length required for full deployment of the wing slat.

In addition to the telescopic lengthening and shortening of the conduit sections, extension and retraction of the wing slat 14 requires rotation of the conduit sections about the axis of the supply duct 16 and about the axis of the spray duct 18. To this end, an elbow-shaped upstream transitional joint 25 forms a substantially gas-tight seal with the outermost conduit section 20 and rotatably interconnects the supply duct. Similarly, an elbow-shaped downstream transitional joint 26 forms a substantially gas-tight seal with the innermost conduit section 24 and rotatably interconnects the spray duct. A compression stop 27, resistance welded to the downstream jointly helps to axially position the conduit sections when the duct assembly is fully retracted.

Each conduit section has an inner surface 28 and an outer surface 30, so that for each pair of adjacent conduit sections the outer section's inner surface opposes the inner section's outer surface. Disposed between each pair of opposing inner and outer surfaces 28 and 30 are an upstream annular slide bearing 32 and a downstream annular slide bearing 34. The slide bearings are affixed at the ends of the duct sections to maximize the stiffness of the duct assembly in all positions.

Turning additionally to FIG. 5, to allow extension and retraction of the conduit sections, the upstream slide bearing 32 is affixed to the outer surface 30 of the innermost conduit section for each pair of opposing inner and outer conduit section surfaces. The upstream bearing slidably engages and presses outward against the opposing inner surface 28, thus permitting relative movement between the upstream slide bearing and the outermost conduit section. The downstream slide bearing 34 is affixed to the inner surface of the outermost conduit section for each such pair of conduit section surfaces. The downstream slide bearing slidably engages and presses inward against the opposing outer surface to permit relative movement between the downstream slide bearing and the innermost conduit section.

Each slide bearing is formed of an annular slide bearing ring 36 longitudinally affixed in an annular retainer 38. The slide bearing ring is made of a suitable material having a low coefficient of friction and capable of withstanding the extreme temperature variations likely to be encountered during flight. In the embodiment shown in FIG. 5, the retainer for the downstream slide bearing ring is constructed from two radially-extending L-shaped members 40 fusion or resistance welded to the inner surface 28 of conduit section 22. The retainer for the upstream side bearing ring is constructed from a single U-shaped member fusion or resistance welded to the outer surface 30 of duct conduit 24.

The upstream leg 42 of the U-shaped member is outwardly tapered. As best seen in FIG. 4, the taper improves the aerodynamics of the flow of bleed air, as the bleed air passes from one telescoping conduit section to an adjacent, telescoping conduit section of a smaller diameter.

Turning additionally to FIGS. 2–4, the pressurized assembly is made substantially airtight by sealing the opposing inner and outer surfaces 28 and 30 on each of the adjacent conduit sections with a seal disposed between the upstream and the downstream slide bearings 32 and 34. An innermost seal 44 is located between the innermost conduit section 24 and the adjacent conduit section 22. Located between the outermost conduit section 20 and the adjacent conduit section 22 is an outermost seal 45.

Each seal is formed of a resilient, annular seal ring 48 having a base 50 and, extending in an outward direction from the base, inner and outer lips 52 and 54, respectively. The seal ring is preferably made of a high temperature-resistant, fluorocarbon material, most preferably, a plastic reinforced polyethylenetetrafluoride material to provide superior heat and wear resistance. The seal ring forms a pressure-energized, gas pocket 56 that is reinforced and further energized by a V- or U-shaped stainless steel spring 58. To maximize the effectiveness of the slide bearings in stabilizing the seals, as well as to maximize the extensibility of each conduit section, each seal is placed adjacent a slide bearing. Furthermore, by placing each seal adjacent an upstream slide bearing 32, the seals are protected from direct impingement by the hot bleed air.

A flange 60 extending radially from each outer surface secures each seal longitudinally. The location of the flange is such that it also acts as a stop for the downstream slide bearing 34 and helps to position the conduit sections 20, 22, and 24 when the duct assembly is fully extended (FIG. 4). This is particularly advantageous in embodiments containing more than two telescoping conduit sections, because the flanges, along with compression stop 27, operate as a series of interrelated stops assuring that the middle conduit section is deployed during extension and retraction and properly positioned when the assembly is retracted.

Another feature is best seen in FIGS. 2–4. A tubular double-wall 66, spaced-apart from the inner surface 28 of the innermost conduit section 24, extends substantially the entire length of the duct section to create an annular airspace 67. The innermost seal 44 is located so that it is opposite the annular airspace at all times. In operation, the annular airspace created by the double-wall fills with relatively stagnant bleed air, so that when the innermost seal and bearings are opposite the airspace they are insulated and, thereby, protected from direct flow of bleed air.

A second double-wall forms an elbow-shaped inner channel 72. The inner channel has an upstream leg 74 leading to a downstream leg 75 formed with a small radius curve segment 76 and a large radius curve segment 78. The upstream leg is welded to the upstream transitional joint 25. The small radius curve segment is inwardly tapered and the large radius curve segment is made elliptical, so that the downstream leg is spaced-apart from the inner surface of the upstream transitional joint creating a second annular airspace 80. The outermost seal 45 is located so that it is opposite the second annular space when the conduit sections are retracted. During operation, the second annular space also fills with relatively stagnant bleed air. The stagnant bleed air insulates and protects the outermost seal and bearings from direct flow of bleed air when the assembly is retracted.

The size and shape of the cross-section throughout the downstream leg is substantially the same as the size and shape of the cross-section of the tubular double-wall 66. As best seen in FIG. 2, when the wing slat is retracted, the downstream leg 75 is aligned with the tubular double-wall 66 and together they create a substantially smooth surface providing good aerodynamics for the flow of air through the assembly. Furthermore, when the assembly is retracted, the inner channel 72 directs the bleed air away from the upstream seals and bearings.

While the invention has been described in detail with reference to certain preferred embodiments thereof, it will be understood that modifications and variations are within the spirit and scope of that which is described and claimed.

That which is claimed is:

1. A slidable duct assembly for conducting air from a fixed component to a component that is movable with respect to the fixed components, comprising:

at least three metallic, telescoping, tubular conduit sections, including an innermost conduit section for movably interconnecting an air supply means to an air delivery means, each conduit section having an inner surface and an outer surface;

an upstream slide bearing and a spaced-apart downstream slide bearing disposed between each pair of opposing inner and outer conduit section surfaces;

a seal disposed between each set of upstream and downstream slide bearings to substantially prevent the escape of air from the duct assembly; and a stop located between each seal and downstream slide bearing to axially position the conduit sections when the duct assembly is fully extended; and at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, so as to taper gradually from the upstream region to the downstream region.

2. The slidable duct assembly in accordance with claim 1 wherein each seal is positioned adjacent one of the upstream slide bearings.

3. The slidable duct assembly in accordance with claim 2 wherein each stop is a flange extending radially from one of the opposing inner and outer conduit section surfaces and longitudinally securing one of the seals.

4. The slidable duct assembly in accordance with claim 3 wherein each stop abuts the upstream end of one of the seals.

5. The slidable duct assembly in accordance with claim 4 wherein each slide bearing comprises an annular retainer longitudinally securing an annular slide bearing ring.

6. The slidable duct assembly in accordance with claim 5 wherein the downstream slide bearing is affixed by the annular retainer to the inner surface and the upstream slide bearing is affixed by the annular retainer to the outer surface for each pair of opposing inner and outer conduit section surfaces.

7. The slidable duct assembly in accordance with claim 6 further comprising a downstream transitional joint forming a substantially gas-tight seal with the innermost conduit section, the outside of the transitional joint having a stop to axially position the conduit sections when the duct assembly is fully retracted.

8. The slidable duct assembly in accordance with claim 7 wherein the movable portion is a movable flight control element.

9. The slidable duct assembly in accordance with claim 7 wherein the movable portion is a wing slat.

10. The slidable duct assembly in accordance with claim 1 wherein each slide bearing comprises an annular retainer longitudinally securing an annular slide bearing ring.

11. The slidable duct assembly in accordance with claim 10 wherein the downstream slide bearing is affixed by the annular retainer to the inner surface and the upstream slide bearing is affixed by the annular retainer to the outer surface for each pair of opposing inner and outer conduit section surfaces.

12. The slidable duct assembly in accordance with claim 1 further comprising a downstream transitional joint forming a substantially gas-tight seal with the innermost conduit section, the transitional joint having a stop to axially position the conduit sections when the duct assembly is fully retracted.

13. The slidable duct assembly in accordance with claim 1 wherein the movable portion is a movable flight control element.

14. The slidable duct assembly in accordance with claim 1 wherein the movable portion is a wing slat.

15. A slidable duct assembly for interconnecting a fixed portion of an aircraft wing to a movable flight control element movable between a retracted position and an extended position with respect to the fixed portion comprising:

at least three metallic, telescoping, tubular conduit sections for movably interconnecting an air supply duct to an air delivery duct, each conduit section having an inner surface and an outer surface;

an upstream slide bearing and a spaced-apart downstream slide bearing disposed between each pair of opposing inner and outer conduit section surfaces;

a seal disposed between each set of upstream and downstream slide bearings to substantially prevent the escape of air from the duct assembly; and a stop located between each seal and downstream slide bearing to axially position the conduit sections when the duct assembly is fully extended; and at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference and a region therebetween having decreasing circumference, so as to taper gradually from the upstream region to the downstream region.

16. The slidable duct assembly in accordance with claim 15 wherein each seal is positioned adjacent one of the upstream slide bearings.

17. The slidable duct assembly in accordance with claim 16 wherein each stop is a flange extending radially from one of the opposing inner and outer conduit section surfaces and securing one of the seals.

18. The slidable duct assembly in accordance with claim 17 wherein each stop abuts the upstream end of one of the seals.

19. The slidable duct assembly in accordance with claim 18 wherein each slide bearing comprises an annular retainer longitudinally securing an annular slide bearing ring.

20. The slidable duct assembly in accordance with claim 19 wherein the downstream slide bearing is affixed by the annular retainer to the inner surface and the upstream slide bearing is affixed by the annular retainer to the outer surface for each pair of opposing inner and outer conduit section surfaces.

21. The slidable duct assembly in accordance with claim 20 further comprising a downstream transitional joint forming a substantially gas-tight seal with the innermost conduit section, the transitional joint having a stop to axially position the conduit sections when the duct assembly is fully retracted.

22. The slidable duct assembly in accordance with claim 21 wherein the movable flight control element is a wing slat.

23. The slidable duct assembly in accordance with claim 15 wherein each slide bearing comprises an annular retainer longitudinally securing an annular slide bearing ring.

24. The slidable duct assembly in accordance with claim 23 wherein the downstream slide bearing is affixed by the annular retainer to the inner surface and the upstream slide bearing is affixed by the annular retainer to the outer surface for each pair of opposing inner and outer conduit section surfaces.

25. The slidable duct assembly in accordance with claim 15 further comprising a downstream transitional joint forming a substantially gas-tight seal with the innermost conduit section, the transitional joint having a stop to axially position the conduit sections when the duct assembly is fully retracted.

26. The slidable duct assembly in accordance with claim 15 wherein the movable flight control element is a wing slat.

27. A slidable duct assembly for interconnecting a fixed portion of a leading edge of an aircraft wing to a movable flight control element movable between a retracted position and an extended position with respect to the fixed portion comprising:

at least three metallic, telescoping, tubular conduit sections for movably interconnecting an air supply duct to an air delivery duct, each conduit having an inner surface and an outer surface;

an upstream slide bearing affixed to the outer surface and a spaced-apart downstream slide bearing affixed to the inner surface of each pair of opposing inner and outer conduit sections surfaces;

a seal positioned adjacent each of the upstream bearings to substantially prevent the escape of air from the duct assembly; and a flange extending radially from each of the opposing outer conduit section surfaces, abutting the upstream end of the seal corresponding thereto, to longitudinally secure that seal and to axially position the conduit sections when the duct assembly is fully extended; and at least one flow facilitating member, operably disposed on at least one of the conduit sections, for prompting the conducting of air from at least one of the conduit sections to a desired successive one of the conduit sections, the at least one flow facilitating member comprising a circumferentially disposed member having an upstream region having a first circumference, a downstream region having a second circumference less than the first circumference, and a region therebetween having decreasing circumference, so as to taper gradually from the upstream region to the downstream region.

28. The slidable duct assembly in accordance with claim 27 further comprising a downstream transitional joint forming a substantially gas-tight seal with the innermost conduit section, the outside of the transitional joint having a stop to axially position the conduit sections when the duct assembly is fully retracted.

* * * * *

UNITED STATES PATENT AND TRADEMARK OFFICE
CERTIFICATE OF CORRECTION

PATENT NO. : 5,865,400
DATED : February 2, 1999
INVENTOR(S) : Walter E. Pike
Jan C. Shafer It is certified that error appears in the above-indentified patent and that said Letters Patent is hereby corrected as shown below:

ON THE TITLE PAGE:

In the Title: After "AIRCRAFT" delete "ANIT-ICING" and insert instead -- ANTI-ICING --.

Col. 1 After "AIRCRAFT" delete "ANIT-ICING" and insert instead -- ANTI-ICING --.

Signed and Sealed this

Sixteenth Day of May, 2000

Attest:

Q. TODD DICKINSON

*Attesting Officer*  *Director of Patents and Trademarks*